UNITED STATES PATENT OFFICE.

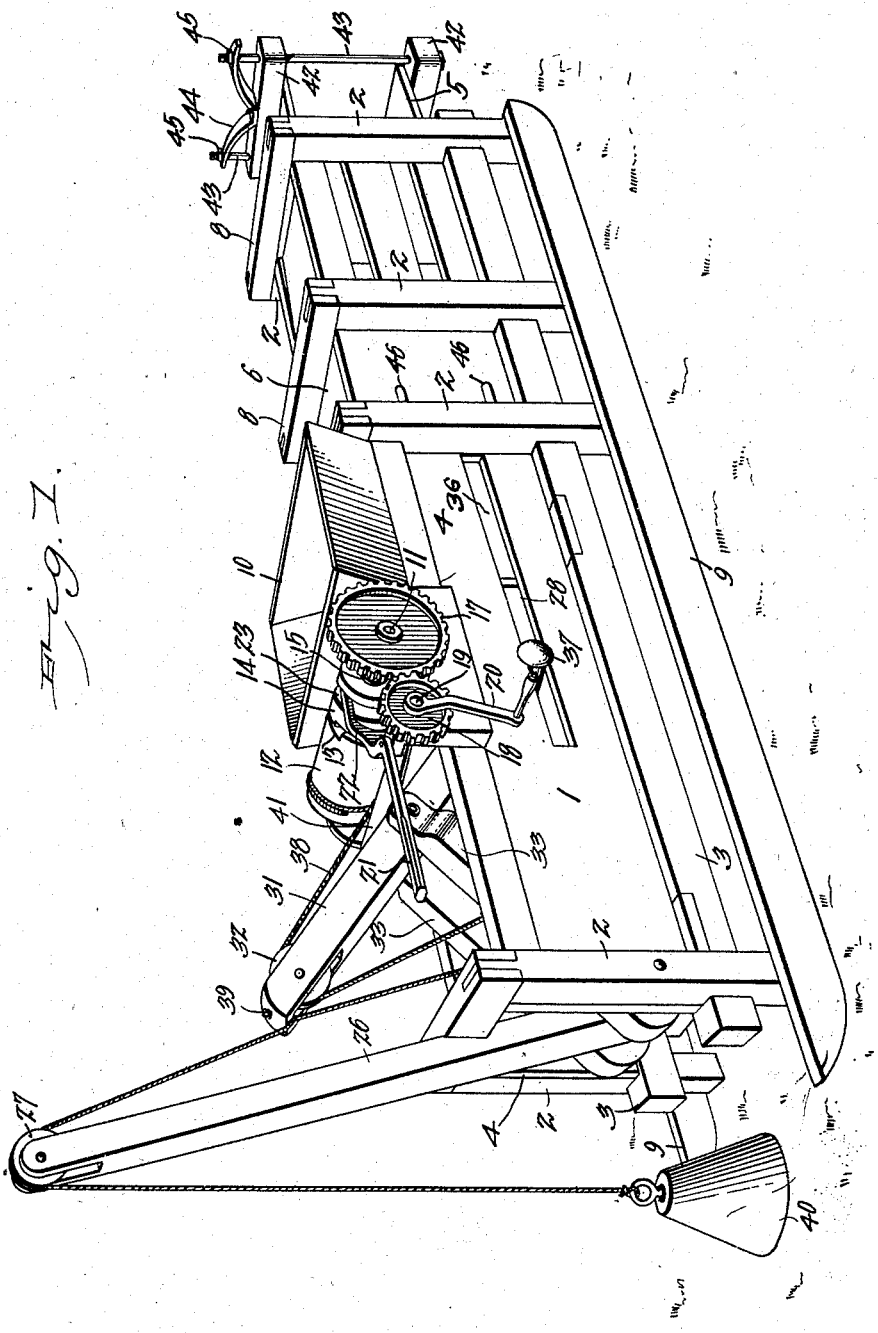

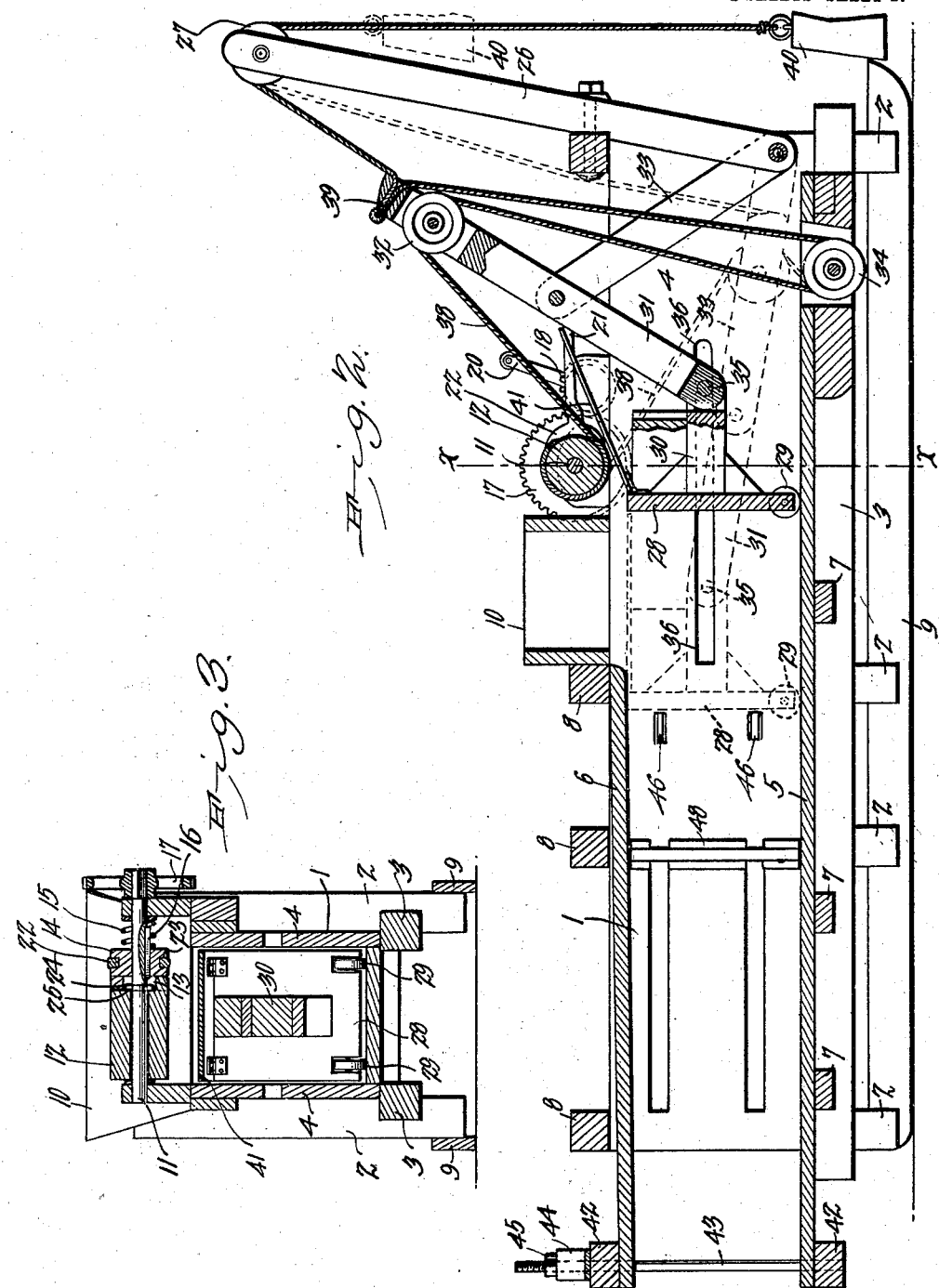

JOHN W. McNAIR, OF SILOAM SPRINGS, ARKANSAS.

HAY-PRESS.

SPECIFICATION forming part of Letters Patent No. 720,055, dated February 10, 1903.

Application filed July 7, 1902. Serial No. 114,669. (No model.)

*To all whom it may concern:*

Be it known that I, JOHN W. MCNAIR, a citizen of the United States, residing at Siloam Springs, in the county of Benton and State of Arkansas, have invented a new and useful Hay-Press, of which the following is a specification.

This invention relates to hay-presses; and it has for its object to provide a device of this class which shall possess superior advantages in point of simplicity, durability, and general efficiency and in which the follower may be swiftly withdrawn at the instant it reaches the forward limit of its movement to enable material to be fed into the press-box.

The invention consists in the improved construction, arrangement, and combination of parts, which will be hereinafter fully described, and particularly pointed out in the claims.

In the accompanying drawings, Figure 1 is a perspective view of a hay-press constructed in accordance with my invention. Fig. 2 is a longitudinal sectional view of the same. Fig. 3 is a transverse sectional view taken on the line $x$ $x$ in Fig. 2.

Corresponding parts in the several figures are indicated by like characters of reference.

1 designates the press-box, which is constructed in the usual manner with the uprights 2 2, sills 3 3, sides 4 4, bottom 5, top 6, cross-pieces 7, supporting the bottom, and top cross-pieces 8. The entire press-frame is supported upon skids or runners 9 9 to enable it to be conveniently moved.

Suitably mounted upon the press-box is a hopper 10, through which the hay or material to be compressed is fed into the press-box. In front of the hopper are bearings for a shaft 11, carrying a drum 12, one end of which is formed with a clutch 13, normally engaged by a sliding clutch member 14, which is held in contact therewith by means of a spring 15. The sliding clutch member 14 is connected with the shaft by a key 16, so as to revolve therewith, while the drum 12 is free to revolve on the shaft unless connected therewith by the clutch member 14.

One end of the shaft 11 carries a gear-wheel 17, meshing with a pinion 18 upon a shaft 19, which in practice may receive motion from any suitable source of power and in any convenient well-known manner. In the drawings I have shown the said shaft 19 provided with a crank 20; but this may of course be dispensed with when power is used.

21 designates a lever having a forked end 22, engaging an annular groove 23 in the clutch member 14, which may thus be moved upon the shaft against the tension of the spring, so as to disengage from the drum 12. A pin 24, extending transversely through the shaft 11, engages an annular recess 25 in the end of the drum, thereby preventing the latter from moving slidingly upon the shaft or to follow the clutch member 14 when the lever 21 is thrown to disengage the said clutch member from the drum.

At the front end of the press-box is mounted an upright 26, carrying at its upper end a pulley 27. 28 designates a follower which is arranged to reciprocate in the press-box, it being supported upon friction wheels or casters 29 in order to reduce the friction. The follower is provided with a forwardly-extending bracket 30, having pivotal connection with the lower end of a lever 31, the upper end of which carries a pulley 32. The lever 31 is connected by a link or toggle 33 with the lower end of the upright 27. A pulley 34 is suitably journaled in the bottom of the press-box, near the front end of the same.

The pin 35, by means of which the lever 31 is connected with the bracket 30 of the follower, is extended through guide-slots 36 in the sides of the press-box and is provided with heads 37. Said pin may also be provided with friction-rollers engaging the said slot. The heads 37 will be sufficiently large to engage the outer sides of the press-box, so as to steady the motion of the follower.

A rope 38 has one of its ends connected with the drum 12 and is passed from thence over the pulley 32 under the pulley 34, and back to the upper end of the lever 31, where it is securely attached at 39. From this point it passes over the pulley 27 at the upper end of the upright 26, and to its free end is secured a weight 40 sufficiently heavy to withdraw the follower into the press-box to the point shown in full lines in Fig. 2 of the drawings.

To the upper front edge of the follower 28 is hinged a shield 41, which extends forwardly, as shown, and which when the follower is at the rear limit of its movement, as shown in dotted lines in Fig. 2, extends forwardly under the hopper and serves to support material that may be placed in the hopper until the follower by the means described is returned to the forward limit of its movement when the material thus supported will be dumped into the press-box in rear of the follower and ready to be acted upon by the latter.

The rear end of the press-box is equipped with a frame composed of cross-pieces 42 42 and side pieces or bolts 43, connecting the said cross-pieces and enabling them to be compressed upon the top and bottom of the press-box for the purpose of creating sufficient friction upon the bale that is being expelled to enable the material that is fed into the press in front of said bale to be sufficiently compressed by the action of the follower. A spring 44 is interposed between the upper cross-piece 42 and the nuts 45 upon the bolt 43 in order to permit the parts to yield sufficiently to prevent breakage.

Spring-detents 46 are arranged in the sides of the press-box in the usual manner to prevent the hay compressed by the action of the follower from following the forward movement of the latter. One or more head-blocks, as 48, of ordinary construction are also used in connection with the device to separate the bales.

The operation and advantages of my improved hay-press will be readily understood from the foregoing description, taken in connection with the drawings hereto annexed, by those skilled in the art to which it appertains. When power is applied to the shaft 11, the clutch member 14 being in engagement with the drum 12, the rope 38 is wound upon the latter, thus depressing the upper end of the lever 31 and causing the follower to be driven by the joint action of said lever and the toggle 33 in a rearward direction to the point indicated by dotted lines in Fig. 2. At the same time the weight supported upon the rope is elevated to the position likewise shown in dotted lines. When the rearward limit of the movement of the follower has been reached, the lever 21 is thrown so as to disengage the clutch member 14 from the drum 12, which is thus permitted to revolve freely upon its shaft, while the weight 40 restores the follower and its related parts to the position shown in full lines in Fig. 2, which is the forward limit of the movement of the follower.

Having thus described my invention, I claim and desire to secure by Letters Patent of the United States—

1. The combination with the press-box having an upright at its front end, of the follower, a lever having pivotal connection therewith, a headed pin effecting said pivotal connection, extended through slots in the sides of the press-box and having heads bearing against said sides, a toggle-joint connecting said lever with the lower end of the upright, a pulley having a fixed bearing in the bottom of the press-box, a winding-drum and a rope passing from the latter over a pulley at the free end of the lever connecting with the follower, thence under the pulley in the bottom of the press-box, thence to the free end of the lever where it is secured, thence over a pulley at the upper end of the upright of the front end of the press-box where it is provided with a weight, substantially as set forth.

2. In a hay-press, the combination with the press-box of the follower having a forwardly-extending bracket, a lever pivotally connected with said bracket and having a pulley at its free end, a toggle connecting said lever with a fixed pivotal point, a pulley journaled to the frame of the press, a winding-drum mounted loosely upon a shaft and having at one end an annular recess engaging a pin extending transversely through the shaft to prevent lateral movement of the drum, a clutch member keyed upon the shaft to revolve therewith, but capable of a sliding movement upon said shaft, a spring holding said clutch member normally in engagement with a clutch formed upon a winding-drum, means for releasing the clutch from such engagement and flexible connecting means between the winding-drum and the free end of the pulley-carrying lever, said connecting means passing over the several pulleys, and gravity means for elevating the free end of the said lever when the winding-drum is unshipped from its shaft.

3. In a hay-press, the combination of the press-box having the hopper, the follower having a forwardly-projecting arm, a pin extending transversely through said arm and through slots in the sides of the press-box, said pin being provided with heads to bear against the sides of the press-box and steady the movement of the follower, substantially as set forth.

In testimony that I claim the foregoing as my own I have hereto affixed my signature in the presence of two witnesses.

JOHN W. McNAIR.

Witnesses:
CHARLES W. DUNLOP,
NICOLAS HALL.